United States Patent [19]

Chow

[11] 3,927,235

[45] Dec. 16, 1975

[54] RECONSTITUTED BOARD PRODUCTS FROM PLANT-FIBER RESIDUES

[76] Inventor: Poo Chow, 907 Shurts St., Urbana, Ill. 61801

[22] Filed: Mar. 18, 1974

[21] Appl. No.: 452,191

[52] U.S. Cl. ............... 428/302; 264/122; 428/524; 428/525; 428/532; 428/526; 428/538; 428/528; 428/498
[51] Int. Cl.$^2$ ............... B32B 27/42; B32B 23/04; B32B 29/00
[58] Field of Search ......... 161/168, 18, 19, 21, 162, 161/182; 52/DIG. 9, 406; 260/9; 264/122, 264/124; 156/62.2, 62.4; 428/498, 525, 526, 428/528

[56] References Cited
UNITED STATES PATENTS

| | | | |
|---|---|---|---|
| 2,066,734 | 1/1937 | Loetscher | 161/162 X |
| 2,645,587 | 7/1953 | Williamson | 260/9 X |
| 2,847,733 | 8/1958 | Roy | 161/162 X |
| 2,876,153 | 3/1959 | Dorland et al. | 161/168 |
| 2,992,152 | 7/1961 | Chapman | 156/280 X |
| 3,224,925 | 12/1965 | Brandts et al. | 264/122 |
| 3,686,384 | 8/1972 | Runton | 264/124 |

FOREIGN PATENTS OR APPLICATIONS 1,419,843   10/1965   France

*Primary Examiner*—George F. Lesmes
*Assistant Examiner*—Paul J. Thibodeau
*Attorney, Agent, or Firm*—David V. Munnis

[57] ABSTRACT

Particleboard produced from fibrous plant residue and waste fibers, comprising a sandwich, laminate-like structure, formed in a one-step pressing operation, having an inner core layer containing supplementary added and in situ cured adhesive and comprising as a major component fibers derived from the "non-stalk" regions of plants, e.g., tree bark, corn cobs, and coffee "grounds", and two face layers, enclosing said inner core layer, each comprising fibers derived from the "stalk" regions of plants.

9 Claims, No Drawings

RECONSTITUTED BOARD PRODUCTS FROM PLANT-FIBER RESIDUES

BACKGROUND OF THE INVENTION

In the past, due to the ready availability of softwoods, such as firs, pines and other conferous species, softwoods provided the fiber particle furnish employed in the production of particleboard. In the technique utilized to produce particleboard from softwood fibers, due to the inherent strength characteristics of softwood fibers themselves, a minor amount of thermosetting resin adhesive, e.g., from about 2 to about 15%, by weight, of a urea-formaldehyde resin or phenol-formaldehyde resin, was added to a mass of discrete softwood fibers, and the resultant mass was subjected to pressure between two heated plates to cure the resin adhesive in situ and compress the bonded fiber mass into a panel. The resultant particleboards have strengths corresponding to a stiffness or modulus of elasticity of about 250,000 p.s.i..

Recently, shortages have developed in the supply of softwoods which not only have traditionally provided the raw material for most wood used in construction and the fiber furnish for particleboard hard board production, but the furnish for the paper industry as well.

OBJECTS OF THE INVENTION

Accordingly, the primary object of the present invention is to provide acceptable particleboard products from fibers other than softwood fibers.

Another object of the present invention is to provide particleboard substitutes for softwood-derived particleboard which have commercial feasibility in terms of availability and cost of raw materials, simplicity of production, and product performance characteristics.

A particular object of the present invention is to provide a commerically acceptable particleboard substitute for softwood-derived particleboard which utilizes, as fiber furnish, fibers heretofore produced as unwanted by-product wastes and residues in lumbering and agricultural industries.

Still another particular object of the present invention is to provide a commerically feasible particleboard substitute for softwood-derived particleboard which utilized not only heretofore waste fibers, but heretofore waste material as fiber adhesive as well.

PARTICULAR EMBODIMENTS OF THE INVENTION

In accordance with the present invention, the above and other objects were found surprisingly to be satisfied by a particular application in particleboard preparation of certain fibers heretofore produced as by-products and considered to be nuisance wastes and residues in the processing of plants for other products, such as for wood, fruits, nuts, grains, extracts, and the like. More specifically, those waste fibers found useful in the present invention are those woody fibers which are found in plants in regions thereof extraneous to and removed from the main stalk or supporting member of the plant. Such non-stalk woody fibers, for example, include those found in plants in an outer coating for the supporting stalk of the plant, such as in tree bark; in foliage on a plant stalk, such as in leaves and needles; and in coatings or supporting structure for seeds, such as in shells, hulls, husks, pits, and the like, e.g., peanut shells, date pits, rice hulls, sunflower seed husks, corn cobs, and coffee bean solids (i.e., coffee grounds). For the purposes of this description, such woody fibers are called "exo-stalk plant fibers" or "exo-s-plant fibers", and it is to be understood that such terms when used herein are intended to refer to the above described type of woody fibers, in contrast to "stalk plant fibers" or as they are sometimes referred to herein, "s-plant fibers". S-plant fibers include, for example, fibers found in sawed boards from trees, corn stalks, bagasse, hemp, cotton stalk, kenaf stalk and the like.

In accordance with the present invention, it is contemplated to utilize any exo-s-plant fiber, regardless of source, althoug, due to their ready availability, it is preferred to use exo-s-plant fiber derived from corncobs, bark from hardwoods i.e., deciduous and broadleaved species, such as cottonwood trees, walnut trees, oak trees, etc., peanut shells, and coffee bean solids.

In the present invention and by means thereof, there is provided a particleboard comprising a sandwich, laminate-like structure, formed in a one-step pressing operation, having an inner core layer of fibers consisting at least 50% by weight, based on fiber total weight, dry basis, of exo-s-plant fiber, said fibers in said core layer being bonded together by an in situ cured thermosensitive adhesive, and two face layers of fibers, enclosing said inner core fiber layer, each of said face fiber layers consisting of at least 70% by weight, based on fiber total weight, dry basis, of s-plant fiber. In the more preferred embodiments of the particleboard of the present invention, the inner core fiber layer consists of more than 50%, total fiber dry weight basis, of exo-s-plant fiber, and the face fiber layers of the sandwich board consist of more than 50%, total fiber dry weight basis, of s-plant fiber. In one or both of the two face fiber layers the fibers may be bonded by supplementally added and in situ cured thermosetting adhesive or may be bonded by natural occurring adhesive, the face fiber layer in the latter case being a veneer sheet of natural wood. To preclude warping of the sandwich board, the two face layers of the board should be essentially the same in composition.

Exo-s-plant fibers are shorter than s-plant fibers, the former being predominantly smaller than 30 mesh, Tyler screen size, and the latter being predominantly greater than 30 mesh. In accordance, preferred embodiments of the invention, exo-s-plant fibers for the inner core and s-plant fibers, when discrete fibers of the latter are used in the face layers, are in a form having such particle size characteristics for use in preparing the board of the invention, and more preferably in such a size corresponding to the s-plant fibers having a bulk density of less than about 12, and preferably less than about 6, pounds per cubic foot, and the exo-s-fibers have a bulk density of greater than about 6, and more preferably greater than about 9, pounds per cubic foot. Accordingly, preliminary to the preparation of the boards of the invention such fibers are treated, if necessary, to convert same into the desired de-fibered forms. Such treatments are known to the art, and any such conventional treatment using the application of attrition, heat, steam, moisture, and combinations thereof are suitable for use in pre-treating the fibers employed in the instant boards. A preferred technique for pre-treating fibers employed in the boards of the present invention involves subjecting the original fiber source, e.g., bark chips, to steam at pressures of 10 p.s.i. to 100 p.s.i. in a screw press to achieve the desired de-fibering since such a technique produces suitably discrete freed fibers without further unwanted comminution of the freed woody fibers, the latter resulting in loss of strength characteristics in the final boards produced.

Advantageously, it has been found that commercially acceptable particleboard can be produced by means of the present invention from exo-s-plant fibers in a one-step pressing operation. In producing boards of the present invention, a suitable amount of a thermo-sensitive, i.e., thermoplastic or thermosetting, adhesive is separately admixed with the exo-s-plant fiber mass, which, when compressed and cured in the subsequent pressing operation, will provide the inner core fiber layer of the sandwich board. In cases wherein one or more of the two face layers of the sandwich board is to be produced from in situ bonded discrete s-plant fibers, one or more masses of s-plant fibers similarly are separately admixed with a suitable amount of a thermo-sensitive adhesive. The amount and identity of the particular adhesive employed is not critical, although it was surprisingly found that by means of the particular application of exo-s-plant fibers in the boards of the present invention, boards comparable in strength to conventional softwood particleboards could be produced using conventional amounts of conventional thermo-setting resin adhesives, i.e., from about 2 to about 15%, dry solids weight basis, of urea-formaldehyde resins, phenol-formaldehyde resins, and the like.

Another feature of the present invention is the finding that another industrial waste by-produce can be employed as the thermo-sensitive adhesive for the exo-s-plant fiber-containing sandwich without any sacrifice to the properties of the particleboard product or the need to utilize expensive processing techniques. More specifically, the invention further contemplates the use, as the thermo-sensitive adhesive in the instant fiber sandwich, of waste sulfite liquor solids which produce aqueous solutions having a pH of from about 7 to about 10. Such waste sulfite liquor solids are obtained by dewatering the waste liquor from conventional wood pulping operations using alkali metal, ammonium, or alkaline earth metal salts to semineutralize the sulfite defibering solutions and containing, for example, combinations of sodium carbonate with sodium sulfite, ammonium sulfite or magnesium sulfite.

In accordance with the present invention, such alkaline waste sulfite liquor solids are admixed into a fiber mass to be bonded thereby in an amount in the range of from about 10 to about 35% by weight of the total fiber, dry solids basis. Although a particular feature of the invention is that such waste sulfite liquor solids provide acceptable boards when employed as the sole adhesive additive, other conventional heat-sensitive adhesives suitable may be used in combination therewith in the adhesive components of the board.

The admixing of the fiber masses with the adhesive component or components, as well as with supplemental adjuvants, such as colorants, water-proofing agents, fire-proofing agents, fungicides and other preservatives, and the like, suitably may be carried out in any conventional mixer to uniformly distribute the additives throughout the fiber mass. The adhesive additives and other adjuvants may be added dry, but preferably are incorporated into the fiber mass in the form of concentrated aqueous solutions or dispersions and dispersed throughout the fiber mass in a rotary mixer and the like.

To produce the sandwich boards of the present invention, an adhesive-containing mat of fibers predominately, i.e., at least 70% by weight total fiber content, dry solids basis, of s-plant fibers is first laid down directly on a support, then an adhesive-containing fiber mat, predominately (i.e., at least 50% by weight total fiber content, dry solids basis) of exo-s-plant fibers is laid down directly on said preliminarily laid mat or sheet, thereafter an adhesive-containing fiber mat predominately of s-plant fibers laid down directly on the intermediate exo-s-plant fiber mat, and thereafter the resultant composite layer of mats is compressed between plates, rolls or other suitable pressing means with a sufficient application of pressure and heat to compress the composite into panels of the desired thickness and density and to activate and cure in situ the thermo-sensitive adhesive thereby bonding the fibers into suitably strong particleboard.

In the above process, the mats of s-plant fibers forming the face layers of the sandwich can be replaced by two thin sheets of natural wood which provides veneer facings in the core inner layer in the final sandwich. When such wood sheets are employed, they may be, and preferably are preliminary coated on the thin faces ultimately contacting the core layers with a dry or liquid adhesive, and the resultant composits are suitably compressed and heated to set the adhesvies present.

In actual operations, the pressures, temperatures, and press times employed depend upon primarily the moisture content of the fiber mats, the thickness and density desired in the final panel, and the adhesive employed. In general, for ease of operation, the moisture content of the fiber mats is maintained in the range of from about 6 to 18%, total weight basis, and at such moisture contents, pressures employed are in the range of from about 250 to 1000 p.s.i., temperatures, are in the range of from about 250° to about 450°F, and press times, are in the range of from about 2 to 50 minutes, with pressures above 500 p.s.i., temperatures above 350°F, and press times longer than about 15 minutes being specifically utilized in applications employing waste sulfite liquor solids as the adhesive.

Under the above conditions, particleboards may be produced in accordance with the present invention having thicknesses in the range of from about 3/16 inch to two inch and densities in the range of from 44 to 64 pounds, characteristic sizes of conventional softwood particleboard and plywood. It is a particular feature of the present invention that the boards thereof, wherein, for example, the ratio of the thickness of the exo-s-plant fiber core layer in the sandwich to the total sandwich thickness is in the range of from about 0.25 to 1 to about 0.8 to 1, can and do have strength characteristics, e.g., a modulus of elasticity of above 250,000, and even above 1,000,000 p.s.i., equal to or better than conventional softwood particleboard and plywood of comparable thicknesses and densities.

In general, the boards prepared in accordance with the above are ready for use as construction panels and the like without further treatment. It has been found, however, that in instances wherein waste sulfite liquor solids are employed as the adhesive, boards having even improved strength properties may be obtained by subjecting such boards to a post-treatment at elevated temperatures, and more particularly at temperatures, in the range of from 380° to about 475°F for at least 15 minutes, e.g., from about 20 to about 40 minutes, such heat treatment being carried out in any suitable heating chamber available. A high frequency heating unit or a microwave oven can substantially reduce the post-treatment time.

In one specific embodiment of the board of the invention, at least one face layer of the sandwich comprises a significant proportion, e.g., up to 50% of the total fiber content, dry weight basis, of comminuted needles of coniferous trees, e.g., pine, spruce, larch, and fir trees, which preferably have been pretreated with a supplemental coloring agent, such as a conventional dye or pigment, to impart an artificial decorative effect, found to be unique, to the resultant board surface. In such boards such needles usually should be comminuted to a minimum length of 3/8 inch.

The invention having been described above in general detail, the following examples are presented to illustrate specific embodiments thereof, it being understood that such examples are given only for illustration purposes and not by way of limitation.

EXAMPLE 1

A batch of cornstalks and a batch of corncobs were separately defiberized in a steam-pressurized, screw-operated refiner operated at steam pressures of about 30 p.s.i. and 100 p.s.i., respectively. To each defibered mass was then applied by a spray gun in a rotary mixer about 7%, dry fiber weight basis, of an aqueous 60–68% solution of urea-formaldehyde resin solids containing a 1% wax emulsion, and the resultant masses were blended separately. The moisture content of each mass was 9–11%. After blending, a mat of the cornstalk fibers is first formed, a mat of the corncob-fibers is laid down directly on the first mat, another mat of the cornstalk fibers is laid down directly on the corncob-containing mat, and thereafter the composite is compressed in a hydraulic hot press with platen temperatures of about 300°F at a pressure of about 400 p.s.i. and a press cycle time of about 10 minutes to produce a board having a thickness of one-half inch and a density of about 47 pounds per cubic foot.

The resultant particleboard had a modulus of elasticity of about 270,000 p.s.i. which is greater than the standard of 250,000 p.s.i. for softwood particleboard.

The above procedure, for comparison purposes, was repeated excepting using all corncob fiber to prepare a totally corncob board and, in another separate run, using the 50—50 mixture of corncob and cornstalk fibers to produce a homogeneous board from the latter mixture. The strengths of these boards were significantly less than that of the sandwich board, i.e., 220,000 p.s.i. and 240,000 p.s.i., respectively.

EXAMPLES 2–15

The general procedure of Example 1 is repeated excepting the following each in turn, is substituted for the steam-pressurized feed for preparing the sandwich face layers and inner core layer in the indicated combinations:

| Example | Face Layers | Core Layer |
| --- | --- | --- |
| 2 | Maple shavings | Corncobs |
| 3 | do do | Walnut bark |
| 4 | Red Oak sawdust | Corncobs |
| 5 | do do | Maple bark |
| 6 | Cottonwood shavings | Red Oak bark |
| 7 | do do | White Oak bark |
| 8 | do do | Cottonwood bark |
| 9 | do do | Instant coffee residue, "grounds" |
| 10 | do do | Peanut shells |
| 11 | do do | Rice hulls |
| 12 | White Oak Shavings-sawdust | Corncobs |
| 13 | do do | White Oak bark |
| 14 | do do | Instant coffee residue, "grounds" |
| 15 | Cornstalk-husks | Peanut shells |

The resultant particleboards have strength characteristics similar to the board of the invention produced in Example 1 and are suitable for use as substitutes for conventional softwood particleboard panels.

EXAMPLE 16

The general procedure of Example 1 was repeated excepting that two 1/8 inch urea-formaldehyde-coated pine sheets were substituted for the cornstalk fiber masses to provide both face layers of the board.

The resultant board has strength greater than conventional softwood particleboard and approaching that of plywood of similar thickness, i.e., 0.875.

EXAMPLES 17–21

The procedure of Example 16 was repeated, substituting various sheets of veneer wood to provide the face layers of the sandwich and substituting various exo-s-plant fibers for the corncob fiber to provide different inner core layers and the following sandwiches having the indicated properties:

| Example | Wood sheet/Core fiber | Panel Total thickness, in. | Panel Density lbs./ft.$^3$ | Modulus of Elasticity, p.s.i. |
| --- | --- | --- | --- | --- |
| 17 | Pine (1/8 in.)/oak bark | 0.625 | 44 | 1,300,000 |
| 18 | Maple (1/8 in.)/cottonwood bark | 0.875 | 46 | 1,400,000 |
| 19 | Walnut (1/8 in.)oak bark | 0.750 | 45 | 1,000,000 |
| 20 | Pine (1/8 in)/corncobs | 0.875 | 48 | 1,200,000 |
| 21 | Birch (1/8 in.)/oak bark | 0.875 | 47 | 1,300,000 |

The strengths of such boards compares favorably with commercial plywood of comparable thickness, e.g., 13-ploy birch plywood of 0.75 inch thickness and a density of 44 pounds per cubic foot has a modulus of elasticity of about 1,200,000 p.s.i.

EXAMPLES 22–43

The general procedures of each Examples 1–21 are repeated, excepting in each case, (a) waste sulfite liquor containing about 15% by weight solids and having a pH of about 8 is substituted for the urea-formaldehyde resin adhesive by incorporating such liquor into the respective fiber mass in an amount corresponding to an addition of waste sulfite liquor solids of about 15%, based upon the total fiber dry weight, (b) the resultant liquor-containing fiber masses are dried to a total moisture content of about 15%, (c) compression of the composite into panels is carried out at a temperature of about 400°F and a pressure of about 600 p.s.i.

for a press cycle of about 30 minutes, and (d) the resultant pressed panels are subsequently heated in a baking oven at about 425°F for about 30 minutes.

The resultant boards each have strength characteristics comparable to conventional softwood particleboard.

What is claimed is:

1. A particle board panel comprising a sandwich, laminate-like structure formed in a one-step pressing and heating step, having (a) an inner core layer containing as a major ingredient exo-s-plant fibers predominantly smaller than 30 mesh, Tyler screen size, and a minor amount of heat-sensitive adhesive, said heat-sensitive adhesive comprising a thermosetting adhesive as the primary binder for said exo-s-plant fibers, said inner core layer being formed in said one-step heating and pressing step from a mat comprising at least 50% exo-s-plant fibers, total fiber dry weight basis and having a moisture content of from about 6 to about 18%, total weight basis, for said exo-s-plant fibers and (b) two face layers, enclosing said inner core layer, each of said face layers containing as a major ingredient s-plant fibers bonded with an adhesive.

2. The particleboard according to claim 1 wherein said face layers comprise bonded masses of discrete s-plant fibers, each of said face layers being formed in said one-step heaating and pressing step from a fibrous mat comprising a thermosetting adhesive and at least 70% s-plant fibers, total fiber dry weight basis, and having a moisture content of from about 6 to about 18%, total weight basis.

3. The particleboard according to claim 1 wherein said face layers are bonded sheets of natural wood veneer.

4. The particleboard according to claim 1 wherein said exo-s-plant fiber in said inner core layer is selected from the group consisting of corncob fiber, sunflower seed husks, hardwood tree bark fiber, coffee bean fiber, and peanut shell fiber.

5. The particleboard according to claim 1 wherein said s-plant fiber in said face layers is cornstalk fiber.

6. The particleboard according to claim 5 wherein said exo-s-plant fiber in said inner core layer is corncob fiber.

7. The particleboard according to claim 1 wherein said heat-sensitive adhesive is waste sulfite liquor solids forming aqueous solutions having a pH of at least 7 and said thermosetting resin is incorporated into said fiber mat in an amount in the range of from about 10 to about 35% by weight of said mat fiber content, dry solids basis.

8. The particleboard according to claim 2 wherein said face layer of s-plant fibers contains comminuted needles of a coniferous tree.

9. The particleboard according to claim 1 wherein said thermosetting adhesive is selected from the group consisting of urea-formaldehyde resins and phenol-formaldehyde resins and said thermosetting resin is incorporated into said mat in an amount in the range of from about 2 to about 15% by weight of said mat fiber content, dry solid basis.

* * * * *